United States Patent
Stokes et al.

(10) Patent No.: US 6,647,921 B2
(45) Date of Patent: Nov. 18, 2003

(54) BIRDFEEDER

(75) Inventors: Gail Stokes, Rowayton, CT (US); Kevin Williams, Brooklyn, NY (US)

(73) Assignee: Duncraft, Concord, NH (US)

( * ) Notice: Subject to any disclaimer, the term of this patent is extended or adjusted under 35 U.S.C. 154(b) by 0 days.

(21) Appl. No.: 09/971,151

(22) Filed: Oct. 3, 2001

(65) Prior Publication Data

US 2003/0010294 A1 Jan. 16, 2003

Related U.S. Application Data

(60) Provisional application No. 60/305,125, filed on Jul. 13, 2001.

(51) Int. Cl.$^7$ .......................... A01K 31/06; A01K 39/01
(52) U.S. Cl. ..................... 119/52.3; 119/57.9; 119/429; 119/463; 119/464
(58) Field of Search ............................... 119/52.3, 428, 119/429, 452, 459, 463, 464, 52.1, 52.2, 57.8, 57.9

(56) References Cited

U.S. PATENT DOCUMENTS

| | | | | | |
|---|---|---|---|---|---|
| D86,381 S | * | 3/1932 | Little | .......................... | 119/459 |
| 2,133,550 A | * | 10/1938 | Little | .......................... | 119/459 |
| 4,434,745 A | * | 3/1984 | Perkins et al. | ............... | 119/57.9 |
| 5,016,573 A | * | 5/1991 | Power | .......................... | 119/428 |
| 5,111,772 A | * | 5/1992 | Lipton | ........................ | 119/57.9 |
| 5,207,181 A | * | 5/1993 | Loken | ........................ | 119/52.3 |
| 5,671,696 A | * | 9/1997 | Liethen | ...................... | 119/57.8 |
| 5,791,286 A | * | 8/1998 | Taussig et al. | ............. | 119/52.2 |
| 5,829,382 A | * | 11/1998 | Garrison | ..................... | 119/52.2 |
| 6,116,189 A | * | 9/2000 | Rundle | ....................... | 119/51.5 |
| 6,192,832 B1 | * | 2/2001 | Husnik | ....................... | 119/52.3 |

OTHER PUBLICATIONS

Victorian Wood and Wire Birdcage. Catalog item [online]. Studion Antiques & Fine Art, Inc., 1998–2000, Pre–1900 design piece [retrieved on Jun. 30, 2002 ]. Retrieved from the Internet: <URL: www.studioantiquesandfineart.com/items/22143/item22143store.html>.*

* cited by examiner

Primary Examiner—Charles T. Jordan
Assistant Examiner—Tara M Golba
(74) Attorney, Agent, or Firm—McCormick, Paulding & Huber LLP

(57) ABSTRACT

A birdfeeder having a base and a cage or openwork attached to the base. The openwork having a plurality of substantially longitudinal members attached to the base and arranged radially about a central axis. A feed container releasably coupled to the base is positioned interior the openwork and spaced-apart therefrom. At least two of the longitudinal members are spaced-apart one from the other such that certain birds can enter the openwork and access the feed container. The openwork can include a plurality of substantially horizontal members wherein at least two of the horizontal members are spaced-apart one from the other to allow certain birds to enter the openwork. The feed container being releasably coupled to the base allows the feed container to be easily removed from the openwork. The feed container can extend through an opening in the openwork for accessing the feed container exterior the openwork.

17 Claims, 3 Drawing Sheets

BIRDFEEDER

CROSS-REFERENCE TO RELATED APPLICATIONS

This application is related to copending U.S. Design Pat. Application No. 29/135,053 filed on Jan. 4, 2001 entitled BIRDFEEDER by Stokes et. al. Said design patent application is incorporated herein by reference. This application claims priority of U.S. Provisional Application No. 60/305,125 filed on Jul. 13, 2001 entitled BIRDFEEDER by Stokes et. al.

FIELD OF THE PRESENT INVENTION

The present invention is directed generally to birdfeeders, and more specifically to birdfeeders having a feed container releasably coupled interior to a cage or openwork. The openwork having openings therein sized to allow certain birds to enter the openwork and access the feed container while preventing other animals or larger birds from entering the openwork and accessing the feed container.

BACKGROUND OF THE PRESENT INVENTION

A well known problem with birdfeeders is that animals such as squirrels or unwanted birds are attracted to birdfeeders as well as the desired birds. Numerous devices for preventing unwanted animals from feeding at birdfeeders are known in the art. For example, an inverted cone, commonly known as a squirrel baffle, is often installed below a birdfeeder mounted on a pole providing a physical barrier to prevent squirrels from climbing the pole to access the feeder. Many hanging feeders have domes mounted over the feed container which provide limited traction for squirrels. Often, the edge of the dome partially defines a gap of limited size through which access to the feeder is restricted.

Additionally, cages or openworks with sized openings that allow birds access to feed containers inside the cage, while keeping unwanted pests out, have been sold. These cages are usually cylindrical and serve a utilitarian purpose. Their generally unappealing appearance detracts from an otherwise enjoyable bird watching experience.

One difficulty often associated with feeders having cages configured in the above-described manner is that when the feed needs replenishing, the complete cage and feeder must be taken from its display position to be refilled. This can be an unpleasant task as the cages can be quite heavy, and one may have to reach quite high, or balance the entire unit for removing or remounting the feeder and cage from a display position.

Based on the foregoing, it is a general object of the present invention to provide a birdfeeder that overcomes the problems and drawbacks of the prior art.

SUMMARY OF THE INVENTION

The present invention is directed in one aspect to a birdfeeder having a base and an openwork coupled to the base and extending outwardly from the base. The openwork includes a plurality of substantially longitudinal members, arranged radially about a central axis. Each of the longitudinal members defines a plurality of bends along its length. A feed container is releasably coupled to and supported by the base. The feed container is positioned interior an area defined by the openwork. At least two of the longitudinal members are spaced-apart one from the other to allow certain birds to enter the openwork therebetween and access the feed container.

In the preferred embodiment the openwork includes a plurality of substantially horizontal members connected to the longitudinal members. The horizontal members can be hoops perpendicular to the longitudinal members. At least two of the horizontal members are spaced-apart one from the other such that certain birds can enter the openwork therebetween for access to the feed container. The longitudinal and horizontal members of the openwork can be decorative as well as functional.

The feed container being releasably coupled to an opening in the base allows a person to remove the feed container from below the openwork without removing and remounting the entire birdfeeder from a hanging display position. The feed container has an opening in an upper portion thereof and a removable cover, such that the interior of the feed container is accessible for refilling the feed or for other purposes.

The openwork includes an opening in an upper portion thereof positioned such that the feed container extends through the opening. This allows the feed container to be accessible exterior the openwork to facilitate refilling the feed container. A handle is attached to the openwork for carrying or hanging the birdfeeder. In the preferred embodiment, the removable cover for the feed container is coupled to the handle so that the cover for the feed container does not get lost or separated from the birdfeeder.

Alternatively, the openwork can have an opening therein having a removable cover or door for providing access to the feed container. In this embodiment, the opening in the openwork is preferably positioned to allow easy access to the feed container therethrough.

In the preferred embodiment, the feed container is releasably coupled to the base of the birdfeeder as well as having a removable cover accessible exterior the openwork. Thus, regardless of whether the birdfeeder is supported by the base or displayed in a hanging position, the feed container can be easily accessed. For example, if the birdfeeder is displayed hanging from above, the feed container can be easily accessed by releasing the feed container from the base of the birdfeeder and removing the feed container from the openwork by lowering it through the opening in the base.

Alternatively, if the birdfeeder is hanging, or supported by the base, the feed container can be easily refilled from above by simply removing the cover on the upper portion of the feed container if it extends through the openwork; or the cover for the feed container can be accessed through an opening in the openwork positioned to allow access to the removable cover of the feed container.

The feed container is transparent and tubular and includes a vent or small opening in an upper portion thereof to prevent gas or other vapors or moisture from accumulating interior the feed container. An end cap closes the bottom of the feed container and has drain holes therein to allow any water interior the feed container to drain therefrom.

The side walls of the feed container have a plurality of longitudinally and radially spaced-apart apertures to serve as feeder ports. Below each feeder port, a perch extends outwardly from the feed container for a bird to stand on while feeding from the feeder port. A hood extends interior the feed container above each feeder port to inhibit feed from falling out of the feeder port. The hood also prevents feed from falling on the beak of a feeding bird. In the preferred embodiment, a one-piece insert fits into each of the apertures in the side walls of the feed container and has a feeder port, hood, and perch integral thereto. However, other arrangements for feeder ports, perches, and hoods are within the scope of the invention and will be obvious to one skilled in the art.

The end cap of the feed container includes a flange having a plurality of upper and lower tabs that cooperate to define horizontal slots adapted to engage corresponding tabs extending from the opening in the base. Thus, the feed container can be inserted interior the openwork and releasably coupled to the base of the birdfeeder by inserting the upper flanges of the end cap of feed container between the corresponding tabs on the opening in the base and rotating the end cap of the feed container such that the tabs on the opening of the base are engagedly interposed between respective upper and lower tabs on the flange of the end cap. Rotating the end cap in an opposite direction releases the feed container from the base of the birdfeeder allowing it to be removed from the openwork. The base includes slots which when aligned with the perches mounted on the feed container allow the feed container to be removed from or replaced within the openwork. Other means, such as threads could be used to releasably couple the feed container to the base.

In the preferred embodiment, the feed container is tubular and made of a transparent polycarbonate. The end cap for the bottom of the feed container and the base are metal. The cover for the feed container and the feeder port inserts are made of brass plated zinc. The longitudinal and horizontal members of the openwork are manufactured of steel with a powder-coat finish. However, other suitable materials, such as plastics, could be used to manufacture any of the components of the birdfeeder of the present invention.

In the preferred embodiment of the present invention, the openwork includes longitudinal and horizontal members resulting in the openwork having a Victorian design. Although the Applicant prefers a Victorian design for the openwork, other designs are possible and within the scope and spirit of the present invention.

DETAILED DESCRIPTION OF THE PREFERRED EMBODIMENT

Figure 1:
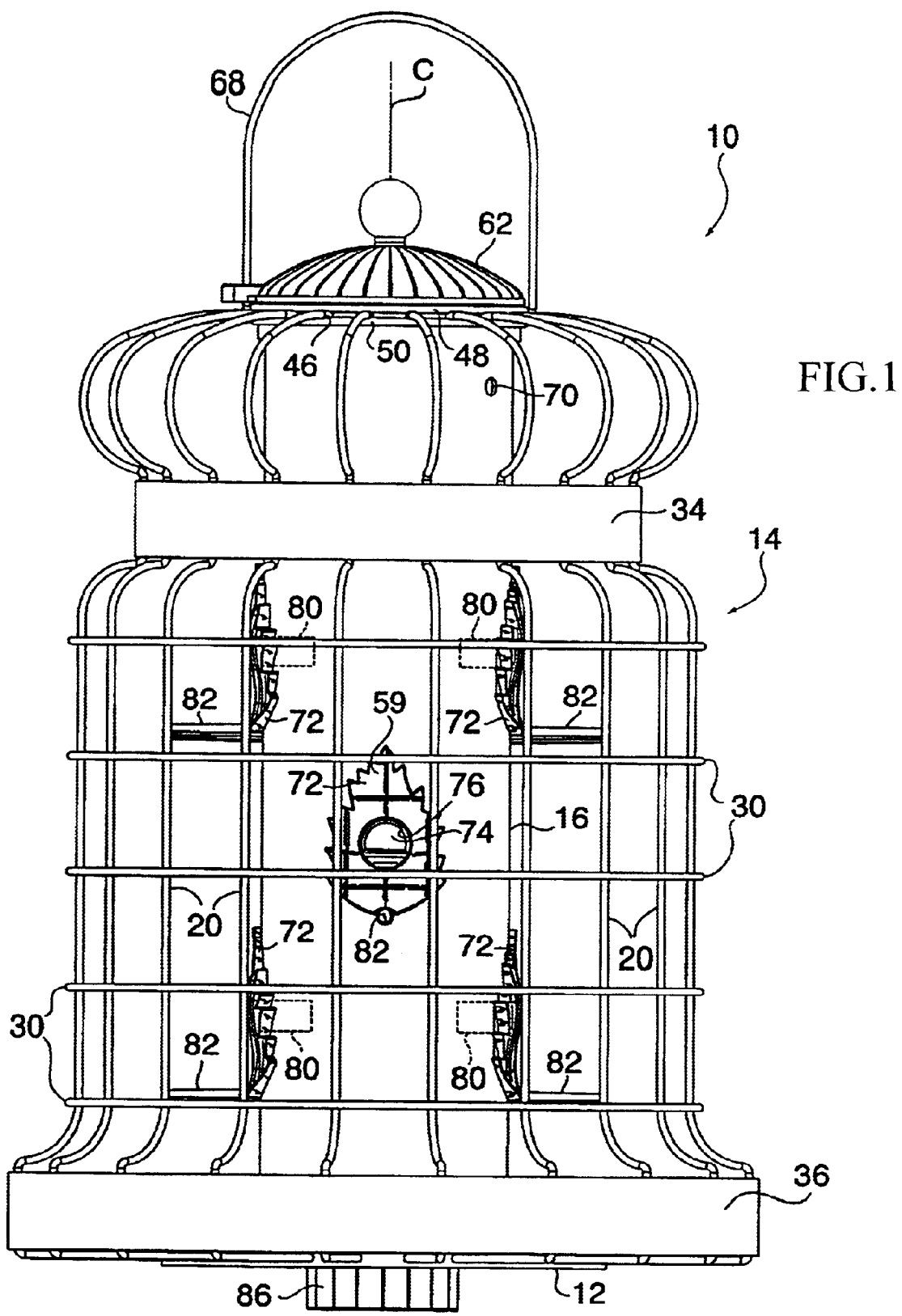
FIG. 1 is a perspective view of the preferred embodiment of the present invention.
Figure 2:
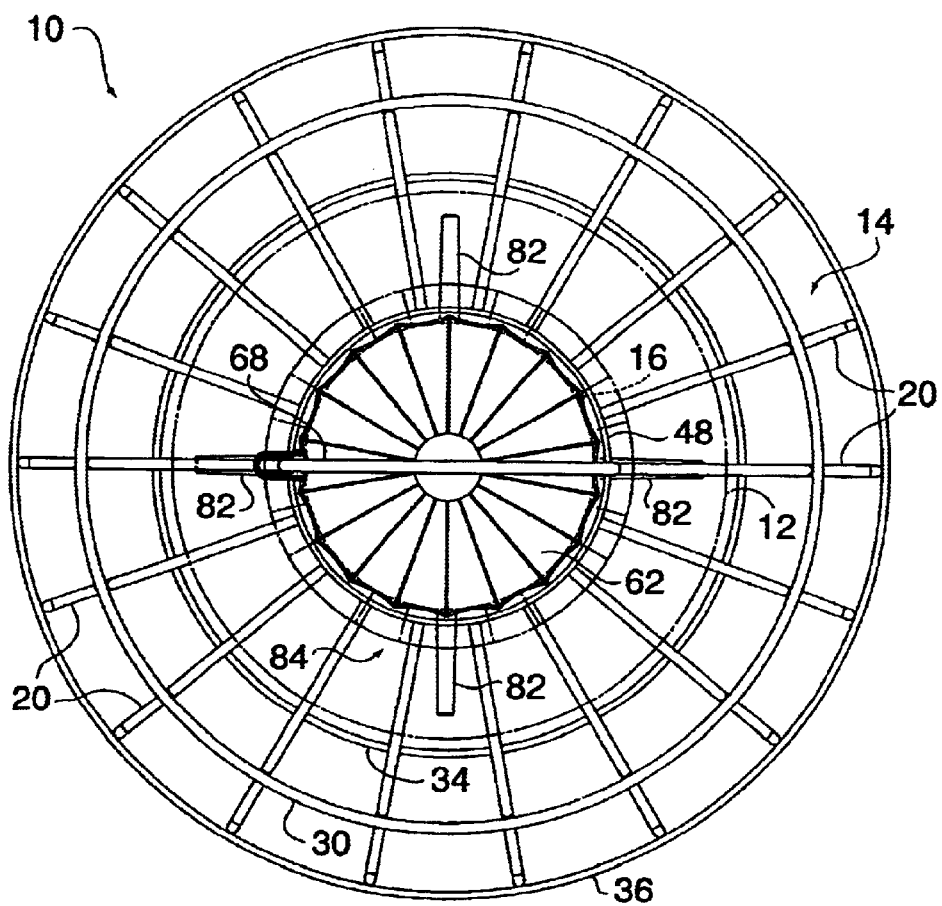
FIG. 2 is a top view of the FIG. 1 embodiment of the present invention.
Figure 3:
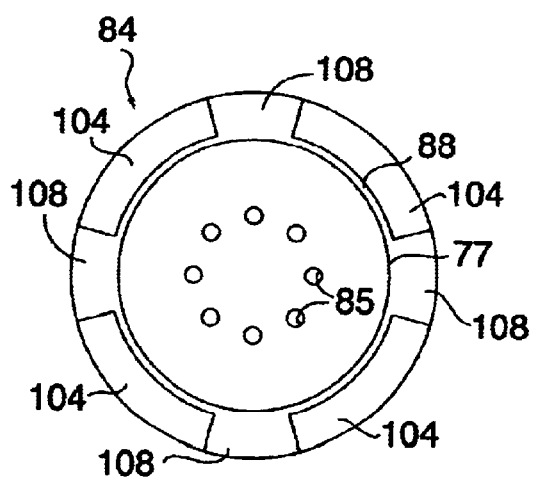
FIG. 3 is a top view of the end cap of the of the feed container of the FIG. 1 embodiment of the present invention.
Figure 4:
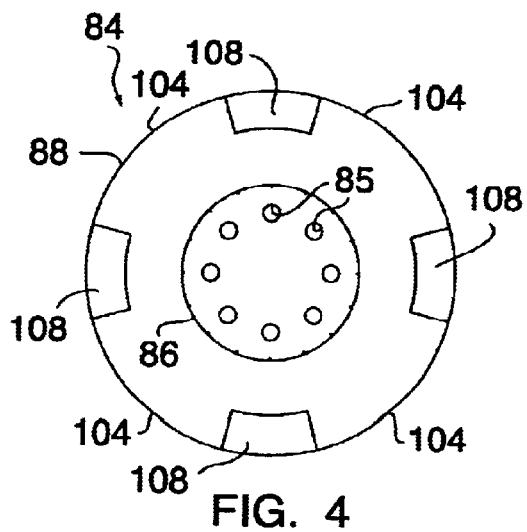
FIG. 4 is a bottom view of the end cap of the feed container of the FIG. 1 embodiment of the present invention.
Figure 5:
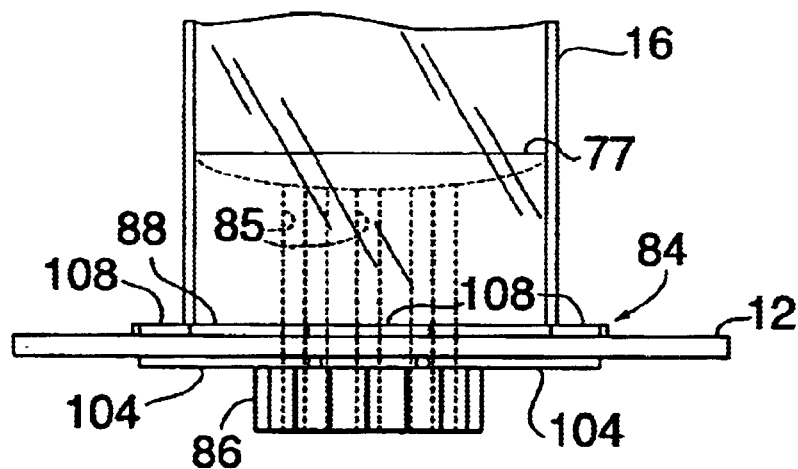
FIG. 5 is a partial side elevational view of the feed container and end cap of the FIG. 1 embodiment of the present invention.
Figure 6:
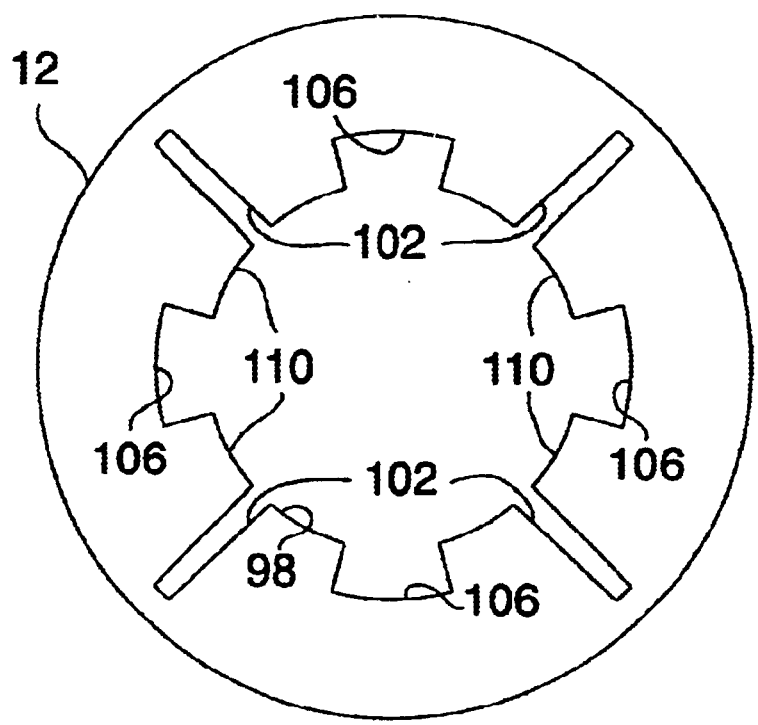
FIG. 6 is a top view of the base of the present invention.

As shown in FIGS. 1 and 2, the present invention birdfeeder generally designated by reference number 10 includes a base 12, and an openwork 14. A feed container 16 is positioned interior to and spaced-apart from openwork 14. Openwork 14 is defined in part by a plurality of longitudinal members 20. The longitudinal members 20 are arranged radially about a central axis C extending through the center of base 12 and at a right angle thereto. At least two of the longitudinal members 20 are spaced-apart one from the other such that certain birds can enter openwork 14 therebetween and access feed container 16.

The openwork 14 is partially defined by a plurality of spaced-apart horizontal members 30 attached perpendicular to the longitudinal members 20. In the preferred embodiment, openwork 14 includes a pair of horizontal bands 34 and 36. The horizontal bands 34 and 36 can be decorative as well as a functional part of openwork 14. At least two of the horizontal members 30 and bands 34 and 36 are spaced-apart one from the other such that certain birds can enter openwork 14 therebetween and access feed container 16.

The longitudinal members 20 have at least three bends in the length thereof. An upper end 46 of each of the longitudinal members 20 is attached to rings 48 and 50 which form an opening in the top of openwork 14. The lower ends of the longitudinal members 20 are attached to the base 12.

Feed container 16 has an open top (not shown) and a removable cover 62 adapted to engage the opening in the top of the feed container. The opening provides access to the interior of feed container 16 for filling the container with feed or for other purposes. A vent or opening 70 in an upper portion of feed container 16 prevents vapors or moisture from accumulating inside feed container 16.

In the preferred embodiment, feed container 16, is transparent and tubular in shape and positioned approximately coaxial with the central axis C of openwork 14. A portion of feed container 16 and/or cover 62 extend through rings 48 and 50 such that the cover 62 of feed container 16 is accessible from the exterior of openwork 14. Openwork 14 includes a handle 68 attached to an upper portion thereof to carry or hang the birdfeeder 10 therefrom.

Feed container 16 includes a plurality of openings or feeder ports 74 spaced-apart longitudinally and radially in the sidewalls thereof. Feeder ports 74 provide birds access to feed (not shown) stored interior of container 16. An insert 72 having an access hole 76 is disposed in each feeder port 74 such that access hole 76 is aligned with feeder port 74. Insert 72 has a hood 80 which extends interior to the feed container 16. The hood 80 prevents the feed from falling out of feeder ports 74 or onto a bird while feeding therefrom. Inserts 72 also have a perch 82 attached thereto and positioned below feeder port 74. An inner end of perch 82 can be anchored directly to the side wall of the feed container 16. In the preferred embodiment the access hole 76, hood 80 and perch 82 are manufactured integral with insert 72, however, other configurations are possible. Insert 72 includes a leaf-shaped decorative portion 59 disposed adjacent the outer surface of feed container 16.

Referring to FIGS. 3–6, an end cap 84 has a vertical portion 77 attached to a lower portion of feed container 16. End cap 84 has drainage holes 85 in a bottom surface thereof. A flanged collar 88 is attached to a lower surface of the vertical portion 77 for releasably coupling feed container 16 attached thereto to the base 12. A hand grip 86 is attached to and extends below the flanged collar 88. A plurality of alternating upper tabs 108 and lower tabs 104 are disposed about the outer radius of the flanged collar 88. Base 12 has opening 98 centered therein for feed container 16 to pass therethrough for removing or replacing the feed container interior of the openwork 14. The opening 98 in base 12 has a plurality of alternating slots 106 and tabs 110 such that the slots 106 correspond to the upper tabs 108 in the flanged collar 88. When feed container 16 is positioned interior the openwork 14 through the opening 98 in base 12, the flange 88 can be coupled to the base 12 by inserting the upper tabs 108 of flange 88 through the slots 106 in base 12 and rotating grip 86 such that tabs 110 on the base are pressingly interposed between the upper and lower tabs 108 and 104 respectively on flange 88, thereby coupling feed container 16 to the base of bird feeder 10. One end of adjacent upper and lower flanges 108 and 104 respectively are connected such that when feed container 16 is inserted into the openwork 14 as described above, the grip 86 can be rotated in only one direction to couple the feed container 16 to the openwork 14. Rotation of the grip 86 in an opposite direction uncouples feed container 16 from the base 12, such that the feed container 16 can be removed from the openwork 14. The opening 98 in base 12 includes elongated slots 102 positioned to allow passage of the perches 82 through the base 12 when inserting the feed container into openwork 14 or removing it therefrom.

While preferred embodiments have been shown and described, various modifications and substitutions may be made without departing from the spirit and scope of the invention. Accordingly, it is to be understood that the present invention has been described by way of example, and not by limitation.

What is claimed is:

1. A birdfeeder comprising:

a base;

an openwork coupled to said base and extending outwardly therefrom;

said openwork having a plurality of substantially longitudinal members arranged radially about a central axis, each said longitudinal members defining plurality of bends along the length thereof, at least two of said longitudinal members spaced-apart one from the other such that certain birds can enter said openwork therebetween;

said open work having a plurality of substantially horizontal members, at least two of said horizontal members spaced-apart one from the other such that certain birds can enter said openwork therebetween;

a feed container releasably coupled to said base and extending into an interior area defined by said openwork;

at least one feeder port in said feed container for a bird to access feed stored therein;

an opening in said base having a plurality of tabs extending inwardly from the perimeter thereof;

an end cap forming a bottom surface of said feed container;

a flange attached to said end cap extending outwardly from the perimeter thereof;

said flange having a plurality of upper and lower tabs on the perimeter thereof which cooperate to define slots adapted to engage the tabs extending from the opening in said base;

wherein said feed container can be inserted through the opening in said base interior the area defined by said openwork and releasably coupled to said base by inserting the upper tabs on the flange of said end cap between the tabs on the opening in said base and rotating said end cap such that said tabs on the opening of the base are engagedly interposed between corresponding ones of said upper and lower tabs on the flange of said end cap; and wherein rotating said end cap in an opposite direction releases the feed container from said base allowing it to be removed from the openwork.

2. The birdfeeder as claimed in claim 1 wherein said openwork further comprises means for accessing said feed container therethrough.

3. The birdfeeder as defined in claim 1 wherein said feed container further comprises an open top having a removable cover thereon.

4. The birdfeeder as claimed in claim 1 further comprising a vent in an upper portion of said feed container.

5. The birdfeeder as claimed in claim 1 further comprising a drain opening in said feed container.

6. The birdfeeder as claimed in claim 1 further comprising means on said openwork to hang said birdfeeder therefrom.

7. The birdfeeder as defined in claim 1 further comprising a perch attached to said feed container proximal said feeder port.

8. The birdfeeder as defined in claim 1 further comprising a hood extending interior said feed container above said feeder port.

9. The birdfeeder as defined in claim 1 wherein said feed container is tubular and positioned approximately coaxial with said openwork.

10. The birdfeeder as defined in claim 1 further comprising an opening in said openwork having a portion of said feed container extending therethrough for facilitating access to said feed container.

11. The birdfeeder as claimed in claim 1 wherein said longitudinal and horizontal members define a Victorian design for said openwork.

12. A birdfeeder comprising:

a base an openwork coupled to said base and extending outwardly therefrom;

said openwork having a plurality of substantially longitudinal members arranged radially about a central axis, each said longitudinal members defining a plurality of bends along the length thereof;

a feed container releasably coupled to said base and extending into an interior area defined by said openwork;

at least two of said longitudinal members spaced-apart one from the other such that certain birds can enter said openwork therebetween for access to said feed container;

an opening in said base having a plurality of tabs extending inwardly from the perimeter thereof;

an end cap forming a bottom surface of said feed container;

a flange attached to said end cap extending outwardly from the perimeter thereof;

said flange having a plurality of upper and lower tabs on the perimeter thereof which cooperate to define slots adapted to engage the tabs extending from the opening in said base;

wherein said feed container can be inserted through the opening in said base interior the area defined by said openwork and releasably coupled to said base by inserting the upper tabs on the flange of said end cap between the tabs on the opening in said base and rotating said end cap such that said tabs on the opening of the base are engagedly interposed between corresponding ones of said upper and lower tabs on the flange of said end cap; and wherein rotating said end cap in an opposite direction releases the feed container from said base allowing it to be removed from the openwork.

13. The birdfeeder as defined in claim 12 wherein said openwork further comprises a plurality of substantially horizontal members; and wherein at least two of said horizontal members are spaced-apart one from the other such that certain birds can enter said openwork therebetween.

14. The birdfeeder as defined in claim 12 further comprising a feeder port in said feed container for a bird to access feed stored therein.

15. The birdfeeder as defined in claim 14 further comprising a perch attached to said feed container proximal said feeder port.

16. The birdfeeder as defined in claim 14 further comprising a hood extending interior said feed container above said feeder port.

17. The birdfeeder as claimed in claim 12 wherein said openwork further comprises means for accessing said feed container therethrough.

* * * * *